United States Patent Office 3,447,243
Patented June 3, 1969

3,447,243
ELLIPSOGRAPH
Ismael Diaz-Esparza, Unidad Santa Fe, Mexico, assignor to Ellipsograph, S.A., Augustin, Mexico
Filed Apr. 18, 1967, Ser. No. 631,754
Int. Cl. B43l 11/04
U.S. Cl. 33—30         3 Claims

ABSTRACT OF THE DISCLOSURE

An ellipsograph made up of a centering needle, a pair of compass arms equally but adjustably spaced with respect to the centering needle, a resilient tracing arm rotatable about the axis of the centering needle, and a reel-borne thread extending in a loop of adjustable length about the lower ends of the compass arms and the tracing arm is disclosed. The mounting for the tracing arm permits it to move vertically as required to keep its drawing tip in contact with the surface on which the ellipse is being drawn. The resilience of the tracing arm urges its tip outwardly at all times to keep the thread loop taut.

---

This invention relates to an instrument for tracing an ellipse onto a surface and, more particularly, to an adjustable ellipsograph for tracing an ellipse with one continuous line.

Instruments have heretofore been developed which allow ellipses to be traced onto paper. However, many of these instruments have required a series of precise tracings to produce one ellipse, and additionally often require different patterns in order to trace ellipses having differing dimensions.

It is thus the primary object of the present invention to provide an adjustable device for tracing ellipses having different dimensions. It is another object of the invention to provide an ellipsograph for drawing an ellipse with one continuous line without the requirement of patterns.

The details of this invention are described in the following description and attached drawings, in which.

Figure 1:
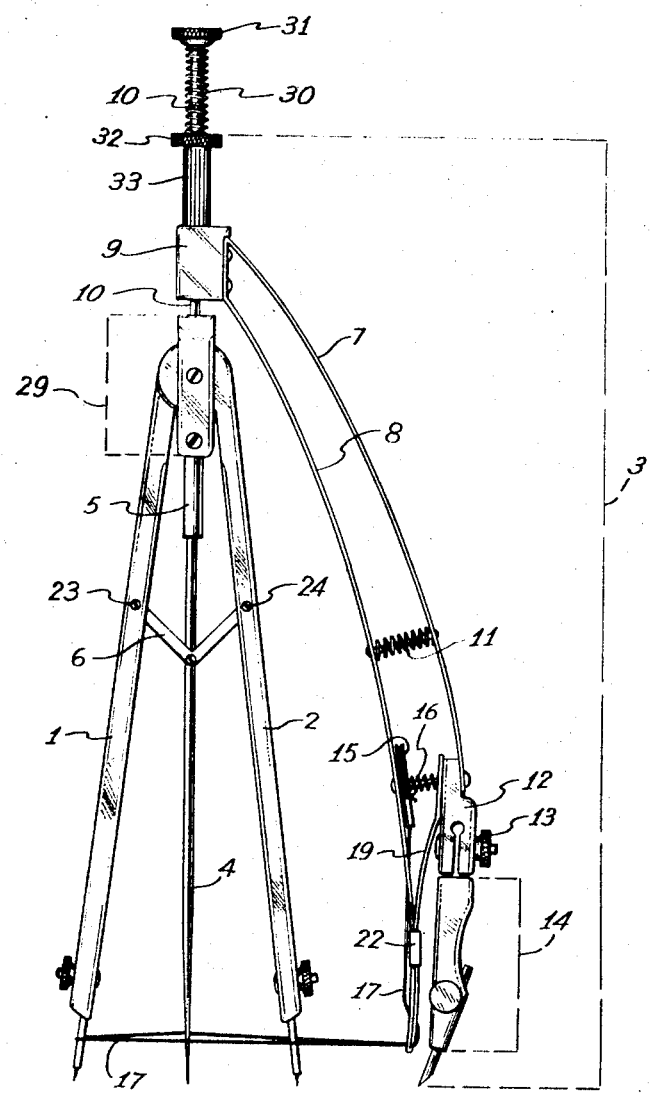
FIGURE 1 is a view of the ellipsograph of the instant invention.

Referring to FIGURE 1, the ellipsograph is comprised of a compass having arms 1 and 2, and a tracing arm 3. A center needle 4 is connected to the compass arms 1 and 2 by the pivoted levers 6, and is adjustable in height by means of the rotatable case 5.

Figure 3:
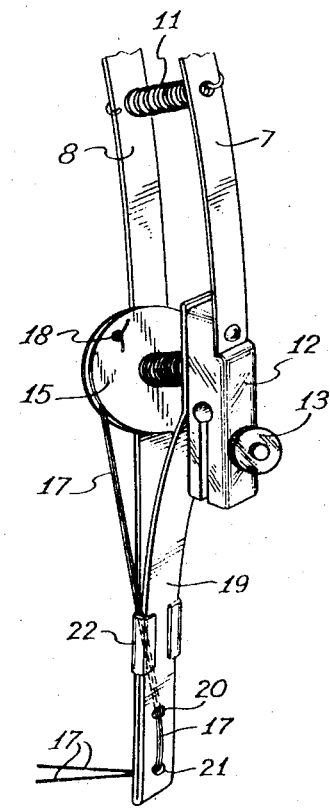
FIGURE 3 is an enlarged view of the lower end portion of the tracing arm of the ellipsograph shown in FIGURE 1.

The tracing arm 3 includes two opposing strip springs 7 and 8 which are each fastened at one end to a turning head member 9 rotatably mounted upon an axis or spindle 10. Springs 7 and 8 are tensioned toward each other by a coil spring 11 which is folded in the middle around spring 7 with its ends are fastened together, so that the first half of the coil spring 11 catches and presses springs 7 and 8 on one side (FIG. 3), while the second half of the spring 11 catches and presses springs 7 and 8 on the remaining side. The lower ends of the springs 7 and 8 are connected to a base 12, as also shown in FIGURE 3. An adjusting screw 13 holds a conventional drawing element 14 securely inside the base 12. A reel 15 is rotatably connected between the spring 8 and the base 12, and a spring 16 provides a tensioning force to the reel.

Thread 17, which may be made of any suitable material such as braided silk, is passed around the ends of arms 1 and 2 and then is threaded through a tapered bore 18 in reel 15. The two ends of the thread 17 are tied together in a knot having a diameter greater than the smallest diameter of the tapered bore 18, but smaller than the largest diameter of the tapered hole 18 in order to allow limited movement of the thread with respect to reel 15. Also connected between the base 12 and spring 8 is a guide member 19 having guide holes 20 and 21 (FIGURE 3) through which the thread 17 passes. Guide member 19 also includes an orifice through which screw 13 attaches base 12 to guide member 19. Another hole (not shown) is provided in guide member 19 to allow connection of the axis of reel 15.

Slidably mounted upon the guide member 19 is a safety catch 22 which may be moved upwardly in order to cover guide hole 20 to hold the thread in a predetermined position while the ellipsograph is tracing an ellipse. Safety catch 22 may also be moved to the lower end of guide 19 (FIG. 3), to allow the thread 17 to run freely through holes 20 and 21 of guide member 19. The tension springs 11 and 16 hold the reel 15 between springs 7 and 8 with a total tension sufficient to securely hold the reel in place until it is deliberately manually rotated, so reel 15 may be used to take and preserve measurements when the ellipsograph is not tracing.

It is thus possible for the operator of the ellipsograph to set the center needle 4 in the desired center of the ellipse to be traced, and to unroll off the reel 15 a sufficient quantity of thread 17 to allow the end of the drawing element 14 to be positioned at the other end of the major axis of the desired ellipse (FIG. 1). The safety catch 22 may then be positioned over the guide hole 20 in order to securely hold thread 17 in the desired position wherein the distance between the center needle 4 and the end of the drawing element 14 becomes one half of the major axis of the ellipse to be traced. The ends of arms 1 and 2 are positioned in accordance with the limits of the thread 17, as will be later described.

Figure 4:
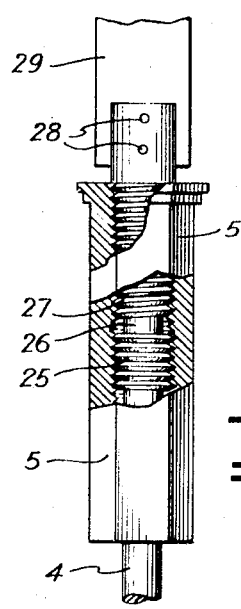
FIGURE 4 is an enlarged view of the precision height adjusting mechanism of the ellipsograph shown in FIGURE 1.

Needle 4 should always be slightly lower than the points of arms 1 and 2 so that it first touches the surface to be traced, and thus the height adjusting case 5 shown in FIGURE 4 is required. Needle 4 is pivotally coupled by the levers 6 to arms 1 and 2 at pivots 23 and 24, so that vertical adjustment of needle 4 results in corresponding lateral movement of the arms 1 and 2.

To allow for precise vertical adjustment of needle 4, the upper end of the needle 4 includes a counterclockwise millimetrical thread 25 and a portion 26 having the original diameter in order to slidably enter a suitable opening into an outwardly threaded rod 27. Rod 27 is clockwise threaded in order to form a retroactive piston in combination with portion 26 of needle 4. Case 5 has an inner threaded chamber adapted to threadedly receive both thread 25 and rod 27, so that rotation of the casing 5 will cause the needle 4 to be vertically adjusted, thereby also causing the arms 1 and 2 to be opened or closed according to the direction in which case 5 is rotated. The upper end of the rod 27 is securely fastened by screws 28 to the upper portion 29 of the compass. This retroactive piston arrangement provides exact precision of adjustment of the instrument.

Figure 2:
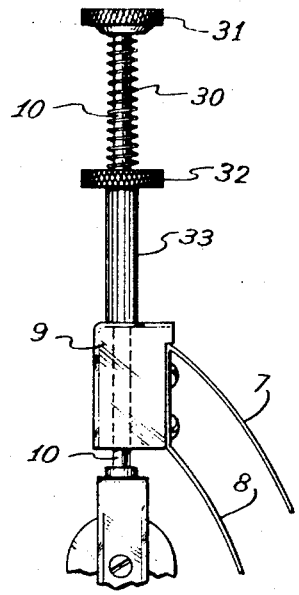
FIGURE 2 is a view of the top portion of the ellipsograph shown in FIGURE 1.

While tracing the ellipse with the instant ellipsograph, the height of arm 3 will vary as it traces from the main axis of the ellipse to a small axis, and back again to the main axis. In order to avoid separating the drawing point of the drawing element 14 from the paper, thereby leaving the ellipse untraced in certain points, a height regulator spring 30 (FIGURES 1 and 2) is provided. The spring 30 is placed between head 31 of axis 10 and disc 32. A sleeve 33 slidably receives the axis 10 and is connected to disc 32. The spring 30 thus tensions the head member 9 downwardly to force the drawing element 14 to contact the paper at all times as arm 3 is rotated about the compass.

In the operation of the ellipsograph, transverse lines may be traced on the paper in order to determine the center point and the dimensions of the ellipse. The point of needle 4 is placed over the crossing of the transverse lines, thus marking the center of the ellipse. A sufficient length of thread 17 is unrolled from reel 15 to allow the end of drawing element 14 to be placed on the outermost extremity of the desired main axis of the ellipsoid and then the end of drawing element 14 is then moved to an outermost extremity of the desired minor axis of the ellipse. Case 5 is rotated to adjust the position of arms 1 and 2 to the extent possible in accordance with the limits of the length of thread 17. After the positions of arms 1 and 2 have been fixed and the length of thread 17 finally determined, catch 22 may be moved to secure the length of thread 17. The ellipsograph is then held by head 31 of axis 10 and tracing arm 3 is turned about the fixed arms 1 and 2 and center needle 4 in order to trace a perfect ellipse having the desired center and major and minor axis.

This invention has been described with particular reference to a preferred embodiment thereof, but it should be understood that various modifications of the apparatus which do not depart from the essence of the invention are to be considered within the spirit and scope of the invention.

What is claimed is:

1. An instrument for tracing ellipses comprising: upright means including an upwardly extending spindle and a coaxial downwardly extending needle element the tip of which is adapted to be placed at the center point of the ellipse to be traced; a pair of compass arms pivotally connected adjacent their upper end portions to said upright means extending downwardly at equal inclinations with respect to said needle element; a turning head mounted on said spindle above said compass arms for vertical movement along and rotation about said spindle and being resiliently biased downwardly with respect to said spindle; a pair of spaced apart strip springs fixed at their upper ends to said turning head and extending downwardly and outwardly therefrom; connector means provided at the lower end portions of said strip means for connecting said springs; said pair of strip springs being adapted to be flexed inwardly at the lower ends thereof toward said needle element; a drawing element connected to the lower end portion of the outer one of said strip springs; and a reel mounted on one of said pair of strip springs and carrying a thread adapted to be drawn out in a loop of predetermined length encircling the lower end portions of said compass arms and the lower end portion of the inner one of said strip springs to restrain outward movement of said pair of strip springs; whereby, upon rotation of said turning head, said turning head will move vertically on said spindle as required to keep said drawing element on the surface with the ellipse to be traced and said pair of strip springs will be flexed inwardly by the thread as the drawing element moves around from the major to the minor axis of the ellipse.

2. An instrucent for tracing ellipses comprising: upright means including an upwardly extending spindle and a coaxial downwardly extending needle element the tip of which is adapted to be placed at the center point for the ellipse to be traced; a pair of compass arms pivotally connected adjacent their upper end portions to said upright means and extending downwardly equal inclinations with respect to said needle element; a turning head mounted on said spindle above said compass arms for vertical movement along and rotation about said spindle and being resiliently biased downwardly with respect to said spindle; a pair of spaced apart strip springs fixed at their upper ends to said turning head and extending downwardly and outwardly therefrom, connector means provided at the lower end portions of said strip springs for connecting said springs; said pair of strip springs being adapted to be flexed inwardly at the lower ends thereof toward said needle element; a drawing element connected with said pair of strip springs adjacent the lower ends thereof and a reel rotatably mounted between said strip springs, and carrying a thread adapted to be drawn out in a loop of predetermined length encircling the lower end portions of said compass arms and the lower end portions of at least one of said strip springs to restrain outward movement of said pair of strip springs; spring means for everting braking forces on said radial to inhibit rotation thereof and hold constant the length of the thread loop, whereby, upon rotation of said turning head, said turning head will move vertically on said spindle as required to keep said drawing element on the surface with the ellipses to be traced and said pair of strip springs will be flexed inwardly by the thread as the drawing element moves around from the major to the minor axis of the ellipse.

3. An instrument according to claim 2 additionally provided with locking means movably mounted on the inner of said strip springs and cooperating with said thread to clamp the thread after the desired length of the thread loop has been established.

References Cited

UNITED STATES PATENTS

| | | |
|---|---|---|
| 1,872,505 | 8/1932 | Ronnig. |
| 2,607,118 | 8/1952 | Debs. |
| 288,770 | 11/1883 | Brown. |
| 3,197,871 | 8/1965 | Stein et al. |

FOREIGN PATENTS

| | | |
|---|---|---|
| 280,432 | 11/1914 | Germany. |
| 632,674 | 7/1936 | Germany. |
| 892,681 | 10/1953 | Germany. |
| 17,954 | 1896 | Great Britain. |

OTHER REFERENCES

Publication: Product Engineering, February 1949, p. 188.

HARRY N. HAROIAN, *Primary Examiner.*